March 10, 1931.  C. L. JOHNSON  1,796,106
TRANSMISSION CASE COVER
Filed Oct. 29, 1927    2 Sheets-Sheet 1
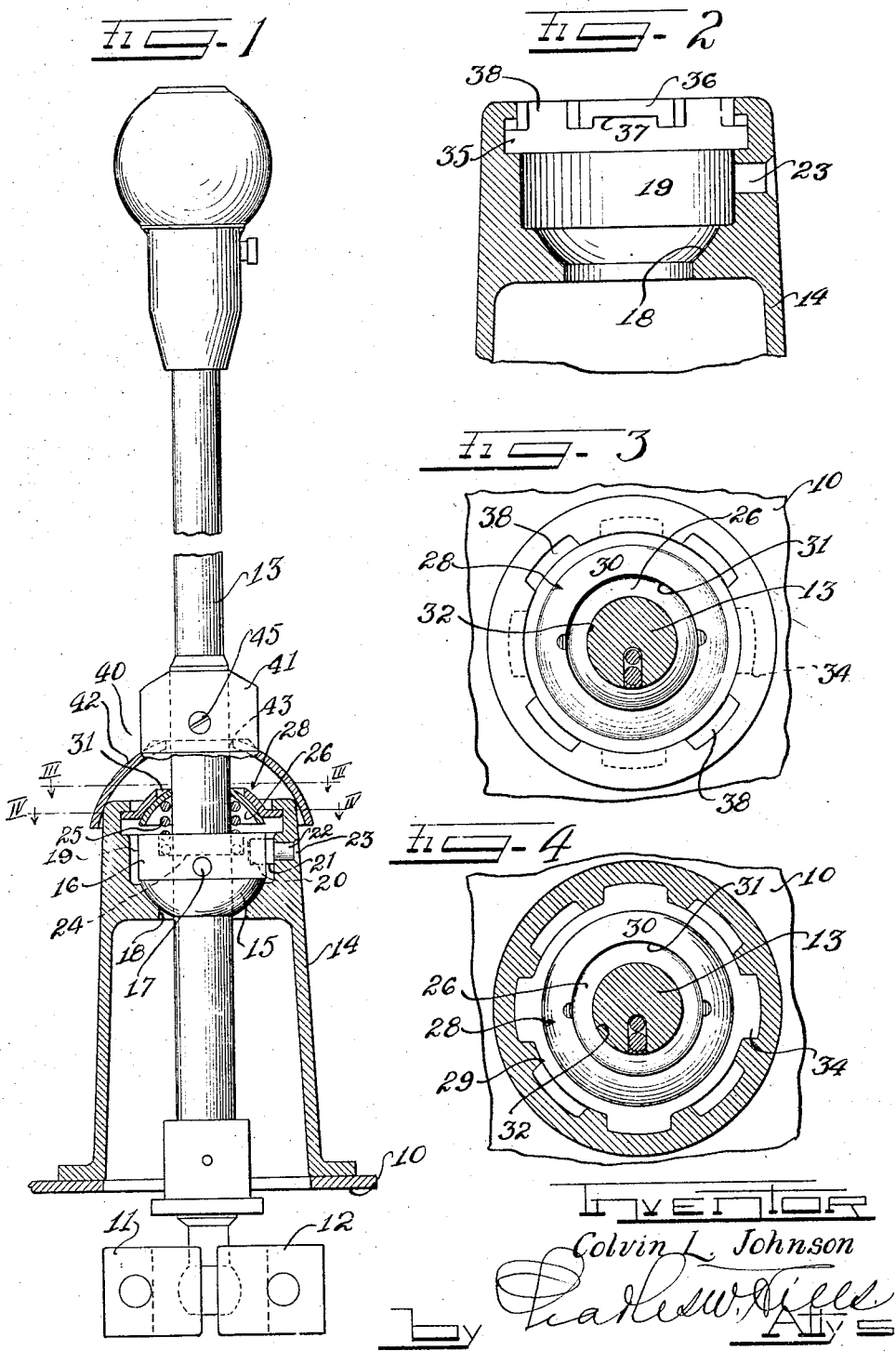
Inventor
Colvin L. Johnson
by
Atty March 10, 1931.   C. L. JOHNSON   1,796,106
TRANSMISSION CASE COVER
Filed Oct. 29, 1927   2 Sheets-Sheet 2
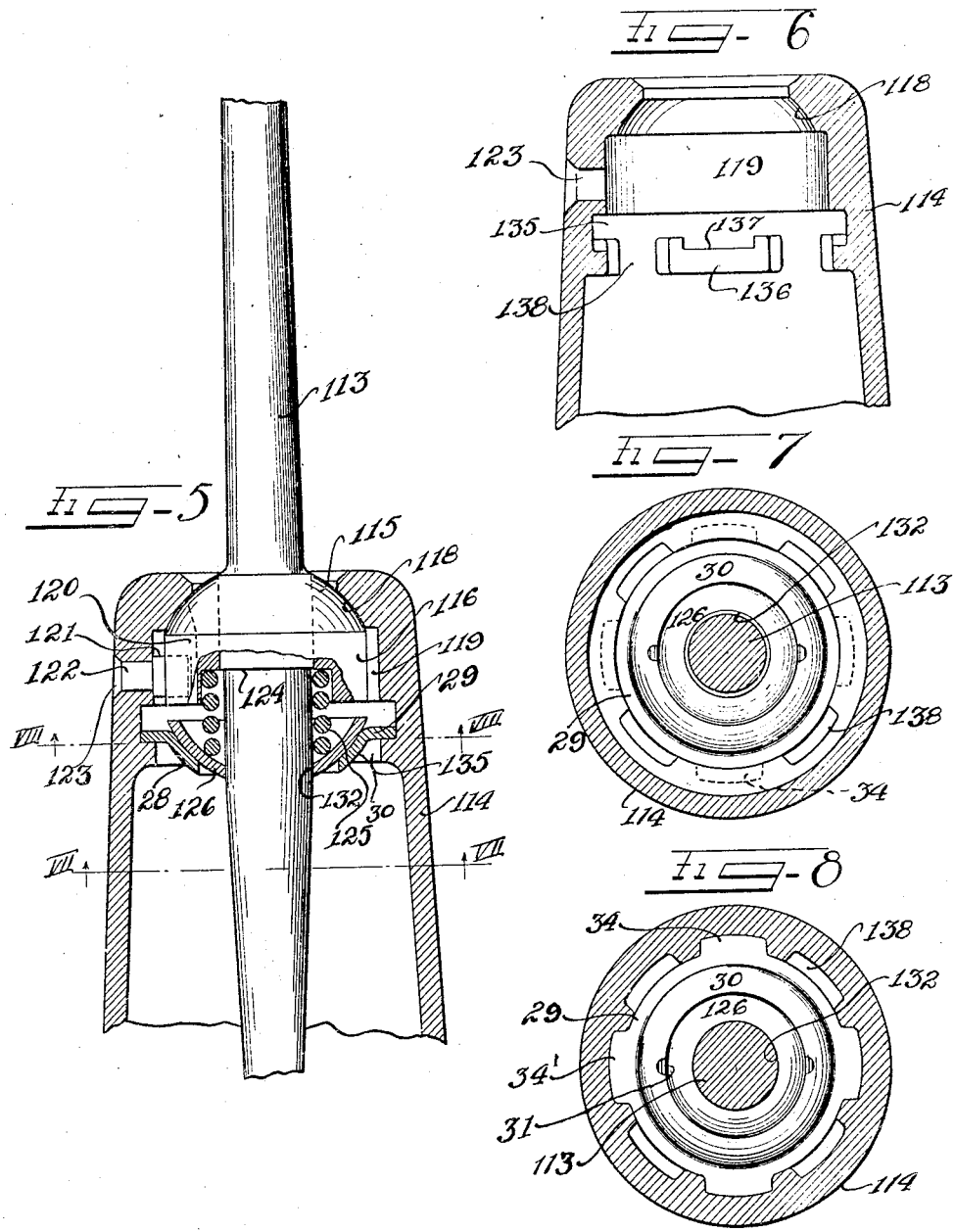
Inventor
Colvin L. Johnson
by Patented Mar. 10, 1931

1,796,106

UNITED STATES PATENT OFFICE

COLVIN L. JOHNSON, OF ST. LOUIS, MISSOURI, ASSIGNOR, BY MESNE ASSIGNMENTS, TO FRANK C. WEBB, OF ST. LOUIS, MISSOURI

TRANSMISSION-CASE COVER

Application filed October 29, 1927. Serial No. 229,565.

My invention relates in general to a transmission case cover and more particularly to an improved mounting for a gear shift lever.

An object of my invention is to provide a greatly simplified mounting for a gear shift lever in which the gear shift lever is adapted to be assembled with facility.

Another object of the invention resides in the provision of a unitary gear shift mounting in which the gear shift lever is adapted to be inserted with facility and in which the intermediate spherical portion of the lever is adapted to be seated and held in place by means of a simple closure plate.

A further object of the invention relates to the provision of relatively simple and inexpensive closure means for maintaining the intermediate spherical portion of the lever in its mounting.

A still further object of the invention is to provide an improved pivotal mounting for a gear shift lever of a greatly simplified construction and adapted to be assembled together with facility in a minimum amount of time.

Other objects and advantages of my invention will more fully appear from the following detailed description taken in connection with the accompanying drawings which illustrate several embodiments thereof, and in which, Figure 1 is a fragmentary elevation of a gear shift lever mounting embodying the features of this invention and being partly in section;

Figure 2 is an enlarged fragmentary sectional view of the upper end of the support for the gear shift lever, the gear shift lever being omitted in order to more clearly show the structural details of the support;

Figure 3 is an enlarged fragmentary sectional view taken on substantially the line III—III of Figure 1 looking downwardly;

Figure 4 is an enlarged fragmentary sectional view taken on substantially the line IV—IV of Figure 1 looking downwardly;

Figure 5 is a fragmentary sectional view, partly in elevation, of a modified form of mounting for a gear shift lever;

Figure 6 is an enlarged fragmentary sectional view of the upper end of the support for the lever shown in Figure 5, the gear shift lever being omitted to more clearly show the structural details of the same;

Figure 7 is a sectional view taken on substantially line VII—VII of Figure 5 looking upwardly; and Figure 8 is a sectional view taken on substantially the line VIII—VIII of Figure 5 looking upwardly.

In the drawings:

Like reference characters designate similar parts throughout the several views.

The reference character 10 designates generally a transmission case which may be of a construction such as that employed in a motor vehicle. Disposed in this case 10 there are a pair of spaced gear shift members 11 and 12 co-operable with a gear shift lever 13. The gear shift lever 13 illustrated in Figure 1 is of the same construction as that disclosed and claimed in my co-pending patent application, Serial No. 171,448, filed February 28, 1927. The lower end of the gear shift lever 13 is co-operable with the members 11 and 12 in the same manner as disclosed in my aforesaid patent application. Secured to the case 10 is an elongated cover member or support 14. This support is of a unitary construction and may comprise a single casting. It serves to provide a seat for an intermediate portion of the lever 13 which will now be described in detail.

Connected to the lever 13 between its ends is a semi-spherical or ball portion 15 which has formed integral with it an annular ring-like portion 16. The portion 16 may be secured to the lever 13 by means of a pin 17. The spherical portion 15 is adapted to be seated upon an annular arcuate shoulder 18 formed in the upper end of the tubular support 14. The support 14 has a cylindrical opening 19 disposed directly above the shoulder 18 and adapted to receive the annular ring-like portion 16 of the lever 13.

In order to prevent the rotation of the lever 13 in the support 14 I provide the ring-like portion 16 with a slot 20 adapted to accommodate the enlarged head 21 of a pin 22. This pin 22 is mounted in an opening 23 formed in support 14. That is to say, the pin 22 is mounted in this opening 23 prior to the introduction of the lever 13 in the support 14. Furthermore, it is to be noted that due to the enlarged head 21 of this pin being in the opening 18 inside of support 14, this pin 22 can only be removed from the support 14 after the lever 13 has been withdrawn from the support.

The annular portion 16 connected to the spherical portion 15 has an annular recess 24 formed therein in which is seated the lower end of a compression spring 25. The upper end of the spring 25 abuts an annular bowl shaped member 26 which in turn is forced into contact with a closure member 28 by the action of spring 25. I shall now describe the construction of the closure member 28 which is of my invention.

The member 28 includes an angular flange 29 and a central arcuate shaped portion 30. This portion 30 defines an opening 31 into which the upper edge of the bowl shaped member 26 extends. It will be noted that the bowl shaped member 26 has a central opening 32 disposed concentric with opening 31 and through which the gear shift lever 13 extends. The annular flange 29 of member 28 has formed integral with it a plurality of spaced lateral ears 34, preferably shown as being four in number. These ears are adapted to co-operate with the upper end of the support 14 to maintain the bowl shaped member 26 in place within the support.

The extreme upper end of the support 14 has an enlarged annular opening 35 disposed directly above and in communication with opening 19, (Figure 2). Projecting into this opening 35 are a plurality of curved lugs 36, preferably four in number. These lugs are disposed concentric with the opening 35. The under side of each of these lugs 36 (Fig. 2) is provided with a recessed portion 37 of substantially the same shape and size as one of the ears 34 on member 28. In fact each of these recessed portions 37 is adapted to serve as a seat for one of the ears 34. The lugs are spaced from each other by arcuate slots 38 of substantially the same shape as the ears 34. In fact, these slots 38 are adapted to receive the ears 34 when the member 28 is being mounted in the upper end of the support 14.

In the assembling of the mounting for the lever 13, the member 28 is pushed downwardly into the opening 35 until its ears 34 clear the bottom edges of the lugs 36. Thereafter the member 28 is rotated to bring its lugs 34 into register with the recessed portions 37 in lugs 36. Obviously the spring 25 will force the member 28 upwardly into co-operation with the lugs 36. That is to say, the ears 34 will be forced into the seats afforded by the recessed portions 37 of the lugs 36. When the member 28 is in this position, the spring 25 will function to force the semi-spherical portion 15 of the lever 13 into the seat 18.

It will be evident that in order to remove the semi-spherical portion 15 from the support 14, it is necessary to first turn the member 28 until its ears 34 are brought out of register with the lugs 36 and into vertical alignment with the slots 38. Thereafter the bowl shaped member 26 and spring 25 may be both removed from the support 14 and the lever 13 may be withdrawn from the support.

Attention is directed to the fact that the bowl shaped member 26 is movable with lever 13 as the lever is shifted from one position to another. Moreover it is to be noted that member 26 is disposed in axial alignment with semi-spherical portion 15 and that the spring 25 is positioned between the member 26 and portion 15. Now it necessarily follows that in the shifting of lever 13 these three elements will move together as a unit and hence spring 25 will not be distorted. This is desirable for the reason that by preventing distortion of spring 25 the lever will stay in the position to which it is shifted. That is to say the spring can not possibly exert any force upon the lever after it has been shifted which would tend to move it back to its neutral position as has been the case in previous mountings for levers employing a spring for holding the lever on its seat.

In order to prevent access to the member 28, I provide a cover 40 for the upper end of the support 14. This cover 40 comprises a collar 41 mounted upon and adapted to be secured to the lever 13, and an arcuate shaped annular member 42 is adapted to seat over the top of the support 14. The central portion of the hood 42 is provided with an opening 43 through which the lever 13 extends. The part of the hood 42 defining this opening 43 extends into a recess 44 formed in the bottom of the collar 41. Obviously, by forcing the collar 41 down into engagement with the upper portion of the hood 42, it is possible to force the hood 42 into tight engagement with the top edge of the support 14. Thereafter the collar 41 may be secured to the gear shift lever 13 by means of a set screw 45.

In Figures 5, 6, 7 and 8 I have shown a modified form of my invention. In this form of the invention, the gear shift lever 113 is adapted to be mounted in the support 114 by inserting it upwardly into the support from the bottom of the support 114. The gear shift lever 113 has connected to it a semi-spherical or ball-shaped portion 115 which is the reverse of the ball-shaped portion 15 in the preferred form of the invention. Formed integral with the semi-spherical portion 115 is an annular portion 116 which extends into an annular recess 119 formed in the upper end of the support 114. The semi-spherical portion 115 is adapted to seat upon an arcuate shoulder 118 formed in the extreme upper end of the tubular support 114. It will be noted from Figure 5 that it is impossible to withdraw the lever 113 upwardly from the support 114 due to the portion 115 engaging the shoulder 118. Due to this construction no cover such as the cover 40 shown in Figure 1 is required for this form of the invention.

The portion 116 has a slot 120 for receiving the enlarged end 121 of a pin 122 mounted in an opening 123 in the upper end of support 114. This pin serves to prevent rotation of the lever 113 relative to the support 114. The enlarged end 121 of this pin extends into the recess 119 which is disposed below shoulder 118. The lower part of portion 116 has a recess 124 in which is seated the upper end of a compression spring 125, the lower end of which abuts the bowl-shaped member 126 having an opening 132 through which the lever 113 extends. This member 126 is of substantially the same construction as the member 26, but is inverted relative to the member 26 shown in Figure 1.

The member 126 abuts a closure member 28. Since this member is exactly the same in construction as that shown the same reference characters will be applied to it. The arcuate shaped rim 30 of this member 28 has contacting it the lower surface of member 126. Flange 29 of this member is disposed in an opening 135 formed in member 114 below opening 119. Extending into this opening 135 and formed integral with the upper end of support 114 are four arcuate lugs 136 separated by arcuate slots 138. Each of these lugs has formed in its upper edge a recess 137 adapted to accommodate an ear 34 of member 28. These lugs 136 co-operate with the ears 34 of member 28 in the same manner as the lugs 36 in the other form of my invention co-operate with these ears. The spring 125 functions to urge the member 28 down into co-operation with the lugs 136. Obviously in order to remove the member 28 from co-operation with these lugs, it is necessary to rotate it until its ears 34 are in register with slots 138. Thereafter the member 28 and the member 126 as well as spring 125 can be pushed downwardly into the lower part of support 114. After this has been done, the lever can be withdrawn from the underside of support 114.

It is of course to be understood that although I have illustrated and described in detail a preferred form of my invention, the invention is not to be thus limited but only in so far as defined by the scope and spirit of the appended claims.

I claim as my invention:

1. In combination, a gear shift lever, a spherical portion connected to an intermediate part of said lever, a support having a spherical shoulder adapted to serve as a seat for said spherical portion, said lever being adapted to be inserted into said support, resilient means for holding the spherical portion on said spherical shoulder and a member for holding the resilient means in place, said member including lateral ears adapted to be inserted in slots formed in said support and adapted upon the rotation of said member to engage lateral lugs connected to the support adjacent said slots, said lateral lugs serving to hold said member in position in said support.

2. In combination, a gear shift lever having a spherical portion connected to it between its ends, a support for said lever having a spherical shoulder serving as a seat for said spherical portion, means for holding said portion in engagement with said seat, a member adapted to be inserted in said support and cooperable with said means to hold the same in position, said member being rotatable about the axis of said gear shift lever to a position wherein it is held against displacement from the support, said spherical portion having connected to it a recessed portion and a pin connected to said support extending into the recess of said latter portion adapted to hold said lever against rotation.

3. In combination, a gear shift lever, a spherical portion connected to an intermediate part of said lever, a support including lateral projections and a seat for said spherical portion of the lever, and closure means cooperable with the support to cover said portion of the lever and to prevent withdrawal of the lever from the support, said closure means including a ring-like member through which the lever extends and including portions for engagement by said projections, said ring-like member being rotatable about the axis of the lever to bring said portions thereof into engagement with the projections on said support.

4. In combination, a gear shift lever, a spherical portion connected to an intermediate part of said lever, a support including lateral projections and a seat for said spherical portion of the lever, and means cooperable with the support to prevent withdrawal from the support, said means including a ring-like member disposed concentric with the lever and rotatable about the axis of said lever into cooperation with said projections on the support, said ring-like member including lateral ears adapted to engage said projections to prevent displacement of said member axially along the lever.

5. As an article of manufacture, a gear shift lever mounting member comprising a semi-spherical ring portion including an opening through which the lever is adapted to extend and a peripheral flange portion including a plurality of lateral lugs adapted for cooperation with a support for the lever to prevent movement of said member axially of the lever.

6. As an article of manufacture, a gear shift lever mounting member comprising a semi-spherical ring portion including an opening through which the lever is adapted to extend and lateral lugs formed so as to be adapted for cooperation with a support for the lever to prevent movement of said member axially of the lever.

In testimony whereof I have hereunto subscribed my name at St. Louis, Missouri.

COLVIN L. JOHNSON.